Figure 1:
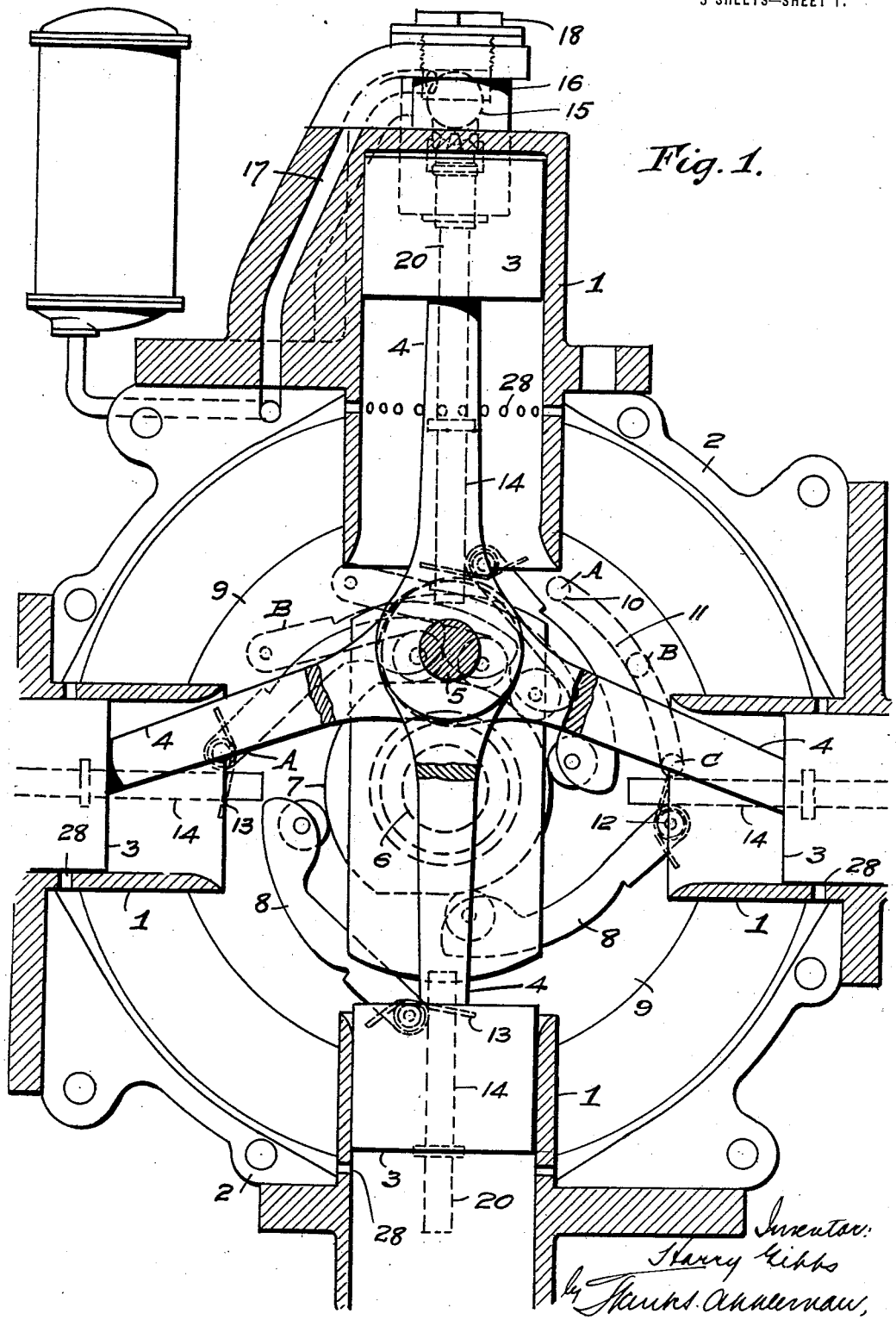

H. GIBBS.
PNEUMATIC ENGINE OR MOTOR.
APPLICATION FILED NOV. 14, 1914.

1,236,922.

Patented Aug. 14, 1917.
3 SHEETS—SHEET 1.

H. GIBBS.
PNEUMATIC ENGINE OR MOTOR.
APPLICATION FILED NOV. 14, 1914.
1,236,922.
Patented Aug. 14, 1917.
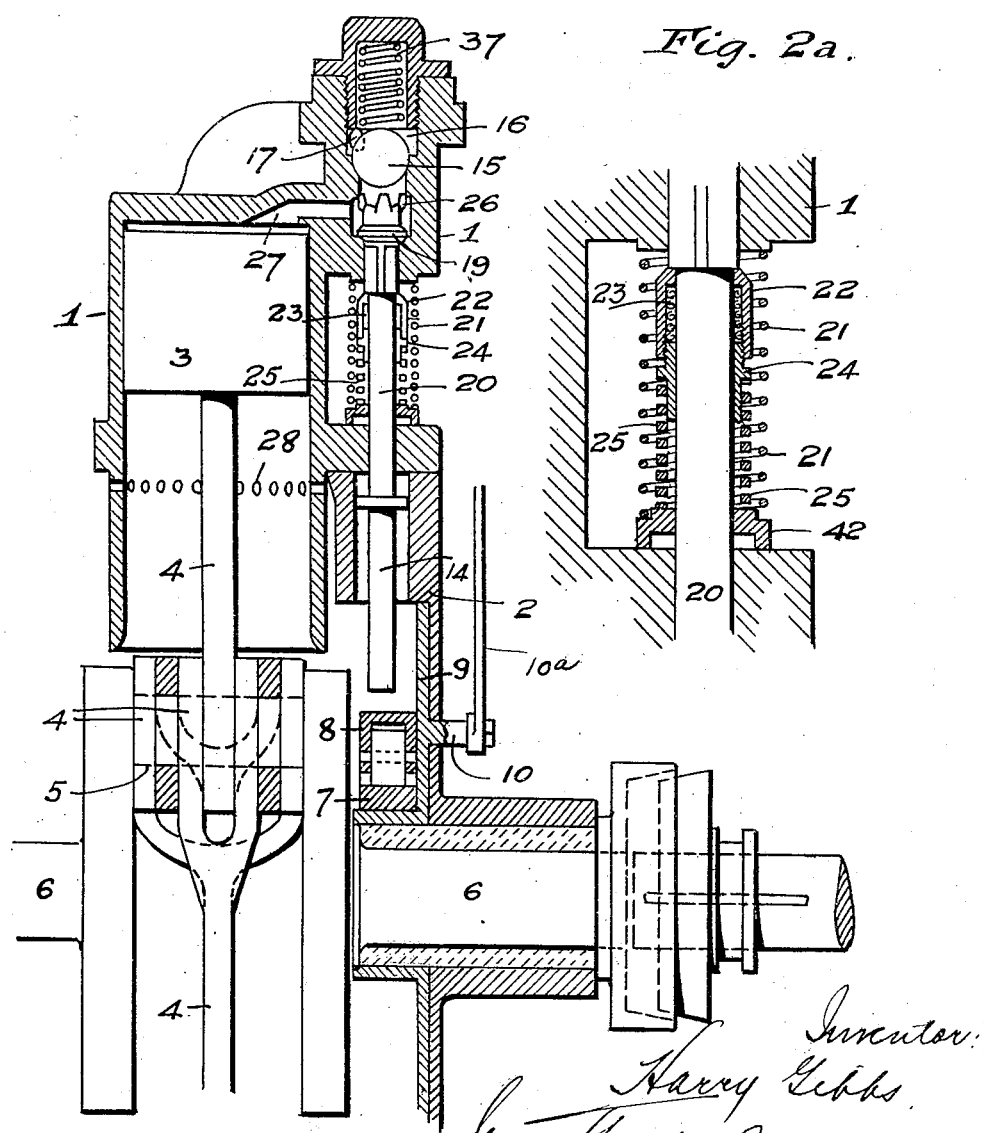

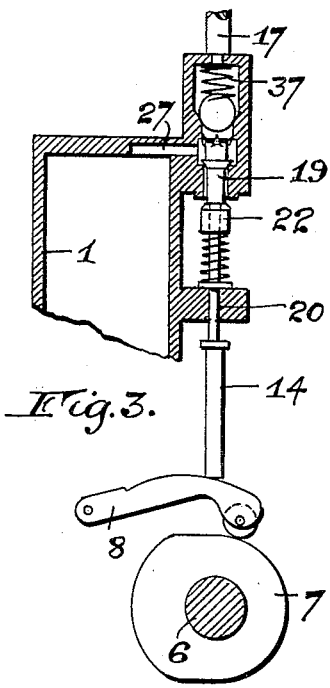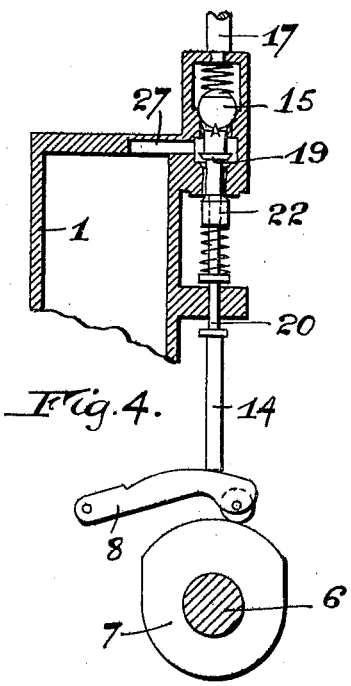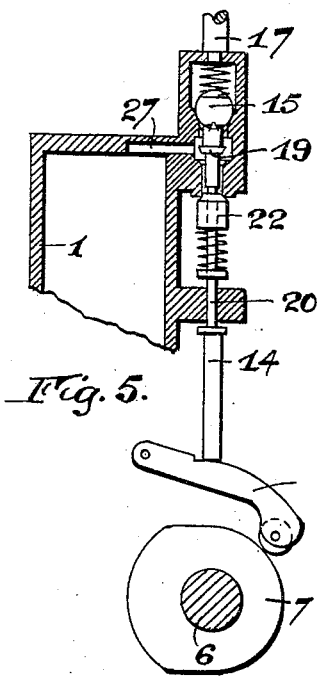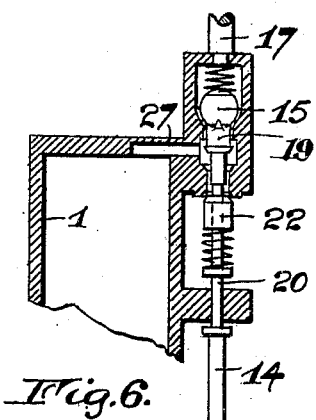

UNITED STATES PATENT OFFICE.

HARRY GIBBS, OF HIGHER TRANMERE, ENGLAND.

PNEUMATIC ENGINE OR MOTOR.

1,236,922.  Specification of Letters Patent.  Patented Aug. 14, 1917.

Application filed November 14, 1914. Serial No. 872,242.

*To all whom it may concern:*

Be it known that I, HARRY GIBBS, a subject of the King of Great Britain, and a resident of Higher Tranmere, Cheshire, England, have invented certain new and useful Improvements in Pneumatic Engines or Motors, of which the following is a specification.

The present invention relates to improvements in pneumatic engines or motors and more particularly to the valve mechanism of the same whereby the apparatus may be converted from a single stage compressor into a fluid pressure engine, and vice versa.

The apparatus according to the present invention may be used as a brake and re-starter for internal combustion engines, whether stationary or applied to road or rail vehicles of any description. When in use as a brake the machine is coupled to the engine shaft, or alternatively to the road wheels and will then be acting as a single stage compressor and while it is being driven is compressing air into a tank or reservoir provided for this purpose. The valve mechanism is preferably provided with a control intermediate the valves and the crank shaft so that on displacement of the control mechanism when the fluid pressure engine is required to act as a re-starter, compressed air from the tank or reservoir will be allowed to act upon each piston of the cylinders of the engine in succession, causing the machine to work as a motor.

In the preferred form, each cylinder of the engine is provided with three valves, one of which, controlling the passage between the cylinders and the tank or compressed air reservoir, is preferably of the automatic type. The second set of valves, preferably of the puppet valve type, control passages leading from the cylinders to the atmosphere. A third set of valves, preferably arranged around the spindles of said puppet valves, are adapted to close the outer end of these passages leading to the atmosphere when the puppet valves are lifted off their seatings to an extraordinary extent, which latter motion is such that the automatic valves are also raised off their seatings preferably by the direct action of the puppet valves thereon. The present invention will be more particularly described with reference to the accompanying drawings illustrating one form of construction by way of example.

Figure 1, shows a sectional elevation of the crank case of an engine according to the present invention with one of the cylinders in position.

Fig. 2. is a section through the cylinder of the device showing valves, the section being taken at right-angles to the position of the cylinder shown in Fig. 1.

Fig. 2$^a$ is an enlarged view illustrating the packing 23, together with its adjusting means.

Fig. 3. shows diagrammatically the position of the valve parts when the device is acting as a single stage compressor.

Fig. 4. shows the valve position on a portion of the inlet stroke corresponding to Fig. 3.

Fig. 5. shows the valve positions when the device is being used as a fluid pressure motor when the particular cylinder is on the exhaust stroke.

Fig. 6. shows a condition of working similar to Fig. 5. when the piston is on its working stroke.

A plurality of cylinders 1, preferably three or more to avoid a dead center, are arranged in any desired position vertically, horizontally, or preferably radially as shown, mounted upon a crank case 2. The cylinders 1 are provided with pistons 3 connected by the usual connecting rods 4 to crank pins 5 on a crank shaft 6 mounted in bearings in the crank case 2. The crank shaft 6, in the case taken by way of example in which the device is used in conjunction with the internal combustion engine of an automobile or like vehicle, preferably has mounted upon it a clutch member which can be thrown into or out of gear as desired with the crank shaft of the engine of the vehicle. The crank shaft 6 has a cam 7 keyed thereto or arranged integrally therewith, and this cam 7 is adapted to coöperate with valve tappet levers 8 mounted upon a plate 9 slidable about the crank shaft 6. The position of the plate 9 relatively to the crank shaft 6 can be adjusted by means of a stud or handle 10 which works in a slot 11 in the crank case, the ends of which slot preferably act as stops for limiting the end positions of the plate 9.

The tappet levers 8 are preferably provided with anti-friction rollers at one end engaging the face of cam 7 and may be of any desired form, that shown being particularly suitable for the arrangement of valve illustrated in the other figures of the drawings. The tappet levers 8 are freely pivoted on pins 12 carried by the plate 9. The tappet levers 8 are held in gear with the cam 7 by springs 13 one end of each of which enters a hole in the plate 9, the springs being coiled about the pivots 12. The tappet levers 8 operate directly upon tappets 14 mounted in spindle bearings in the crank case 2 in the usual manner.

The valve arrangement according to the present invention consists of three sets of valves. The first set comprises automatic valves such as ball valves 15, Fig. 2, controlling a passage 16 communicating through a passage way 17, Fig. 1, with a storage tank or vessel for compressed air. The valves 15 are held on their seatings by springs 37 inclosed in caps 18 screwed into the cylinders 1. The second series of valves comprises preferably puppet valves 19 controlling the passage between the cylinders 1 and the atmosphere. These valves 19 have their shanks or spindles preferably squared or fluted for a certain distance. The stems 20 of said valves act in direct conjunction with the tappets 14. The valves 19 are normally held on their seatings by springs 21 arranged between the valve casing of the cylinders 1 and a collar 42 of usual form on the valve spindles 20.

The third set of valves is in the form of tubular sleeves such as 22 provided internally with packing 23 which may be adjusted by means of a screw 24. This tubular valve 22 abuts normally against the lower end of the squared or fluted portion of the spindles 20, but when the valves 19 are raised into their outermost position farthest away from their seatings upon the cylinder 1, the valves 22 may come into contact with seatings on the cylinder 1 and consequently prevent leakage of air from the cylinder to the atmosphere down the spindles 20 of the valves 19. The valves 22 are held tightly against the shoulders on the valves 19 or alternatively against the seating on the outer surface of the cylinder casings by springs 25 arranged between the valves 20 and, for instance, the collars 42 on the valve spindles 20.

The upper ends of the valves 19 are preferably arranged with portions such as 26 adapted to come into engagement with and lift the automatic valves 15 from their seatings.

The cylinders 1, in addition to the ports 27 communicating with passages, as above described, controlled by the valves 15 and 19 respectively, are provided with a series of ports 28 which are so disposed that they are uncovered toward the end of the stroke of the pistons. These ports communicate with the atmosphere through the crank case 2.

When it is desired to use the arrangement as a single stage compressor or a brake for any moving shaft such as has been suggested above by connecting the crank shaft 6 to the wheels of an automobile vehicle or the like, then the shaft 6 will be clutched suitably to such shaft to be braked or from which power is to be obtained and consequently the pistons 3 will be reciprocated in their respective cylinders 1.

For this purpose the stud or handle 10 is displaced into the position indicated by A in Fig. 1 of the drawings. This will bring the plate 9 into such a position that the tappet levers 8 will all be clear of their respective tappet spindles 14. Consequently rotation of the crank shaft 6 and of the cam 7 will have no effect upon the valves controlling the passages in communication with the cylinder 1. Consequently it will be seen that the puppet valve will remain seated during the whole cycle. On the suction stroke of the pistons in each cylinder 1 a partial vacuum will be created in the cylinder so that as the piston passes below the ports 28 air will pass into the cylinder from the crank case. The piston on its return stroke will compress the charge of air lying between the ports 28 and the passage 27 and directly compression exceeds the pressure of the spring 37 holding the automatic ball valve 15 upon its seat, this latter will be lifted so that the compressed air will pass through the passage 17 to the tank or reservoir in communication therewith. If desired, the control may be so disposed that instead of the puppet valves remaining seated for the whole cycle, the cam will lift the same to provide a free inlet during certain moments of the cycle. This is the preferred form.

In certain cases it may be desirable with the mechanism as shown to obtain a slightly increased charge over that possible by only allowing the vacuum in the cylinder to be released when the pistons move below the ports 28. Consequently if desired the handle 10 may be brought into the position B indicated in Fig. 1. Then as may be seen from Fig. 4 the levers 8 will all be displaced to such an extent that when the lift portion of the cam comes into contact with the tappet rollers the valve spindles 20 will indeed be raised to lift the valve 19 in its seat but not sufficiently to raise the valve 15. Consequently as the pistons in the cylinders move down atmospheric air will be drawn through the passage controlled by the puppet valve 19, which, as previously stated, is lifted just off its seating and, it is to be noticed, not sufficiently to allow the tubular valve 22 to close this passage with the atmosphere. When the piston passes the ports 28 a further supply of air may pass into the cylinder 1, completing the charge. On the upstroke of the piston the valve 19 will go back on its seating so that when the air is compressed to the predetermined degree it will pass beyond the valve 15. The spring 37 on the valve 15 may in certain cases if desired be arranged so that its tension may be regulated from the outside. For instance, this may be effected by screwing up to a greater or less degree the caps 18. It is obvious that the pressure of the other springs may be regulated in a similar manner.

In the case when it is desired for the device to act as a fluid pressure motor, for instance as a re-starter for the engines of automobiles, the plate 9 is moved by means of the handle 10 until this latter comes into the position C indicated in Fig. 1 of the drawings. The tappet levers 8 will then be moved under the tappet spindles 14 to their full extent, the upper surfaces of these tappet levers 8 which coöperate with the tappet spindles 14 being preferably cam shaped to provide the effect desired coöperating with the lifting cam 7. In this position of the parts, one of the valves 15 will be lifted off its seating while the others, in the present instance three, will be in the position illustrated in Fig. 5. The valve which is lifted off its seating will be in the position illustrated in Fig. 6, so that compressed air can pass through the passage 17 under the automatic valve 15 now raised and through the passage 27 into the cylinder 1 so that the piston which will, of course, be at the top of its stroke in this cylinder, will then be forced downward, turning the crank shaft and whatever machinery is in communication therewith, such, for instance, as the crank shaft of the automobile engine which it is desired to turn for the purpose of re-starting. As this piston moves down under the pressure of the compressed air and the crank shaft 6 turns, the cam 7 will no longer hold the tappet lever 8 in a raised position to the degree shown in Fig. 6, but this will fall into the position shown in Fig. 5, whereby communication between the reservoir and the cylinder is now interrupted by the valve 15 returning on its seating, while the valve 19 will be lifted off its seating, but the passage between the cylinder 1 and the atmosphere will be closed owing to the tubular valve 22 closing this passage beneath the squared portion underneath the valve 19. The exhaust of the compressed air in the cylinder will take place through the ports 28 at the bottom of the stroke.

When the device is running as a re-starter or motor in certain cases it may be desirable to arrange the cam 7 of such contour that the tappet levers 18 will drop sufficiently to allow the automatic valves 15 to re-seat themselves and then a further amount sufficient to lift the tubular valve 22 off its seating but not sufficient to re-seat the valve 19 so that air in the cylinder on the upstroke can be exhausted firstly through the ports 28 and then subsequently through the passage 27 communicating with the atmosphere normally controlled by these two valves 19 and 22.

I claim:—

1. In a pneumatic engine or motor, in combination, a series of cylinders, a crank shaft, pistons in said cylinders operatively coupled to said crank shaft, a storage tank, spring valves controlling communication between the cylinders and said storage tank, positively operated valves controlling communication between the cylinders and the atmosphere and adapted to actuate the spring valves controlling communication with the storage tank, a series of pivoted tappets engaging the positively operated valves, and a cam fixed on the crank shaft adapted to actuate the tappets.

2. In a pneumatic engine or motor, in combination, a series of cylinders, a crank shaft, pistons in said cylinders operatively coupled to said crank shaft, a storage tank, spring valves controlling communication between the cylinders and said storage tank, positively operated valves controlling communication between the cylinders and the atmosphere, spring valves also controlling communication between the cylinders and the atmosphere, and closing permissively by the opening movement of the positively operated valves, a series of pivoted tappets engaging the positively operated valves, and a cam fixed on the crank shaft adapted to actuate the tappets.

3. In a pneumatic engine or motor, in combination, a series of cylinders, a crank shaft, pistons in said cylinders operatively coupled to said crank shaft, atmospheric ports in the cylinders adapted to be uncovered by the movement of the pistons, a storage tank, spring valves controlling communication between the cylinders and said storage tank, positively operated valves controlling communication between the cylinders and the atmosphere, a series of pivoted tappets engaging the positively operated valves, a cam fixed on the crank shaft adapted to actuate the tappets, and means for varying the movement imparted by the cam to the tappets.

4. In a pneumatic engine or motor, in combination, a series of radially disposed cylinders, a crank shaft, pistons in said cylinders operatively coupled to said crank shaft, atmospheric ports in the cylinders adapted to be uncovered by the movement of the pistons, a storage tank, spring valves controlling communication between the cylinders and said storage tank, positively operated valves controlling communication between the cylinders and the atmosphere, spring valves also controlling communication between the cylinders and the atmosphere and closing permissively by the opening movement of the positively operated valves, a plate angularly adjustable about the crank shaft, a series of tappets pivoted on said plate, a cam fixed on the crank shaft adapted to actuate the tappets, and means for adjusting the angular position of the tappet plate to vary the effective action of the cam.

5. In a pneumatic engine or motor, in combination, a series of radially disposed cylinders, a crank shaft, pistons in said cylinders operatively coupled to said crank shaft, atmospheric ports in the cylinders adapted to be uncovered by the movement of the pistons, a storage tank, spring valves controlling communication between the cylinders and said storage tank, positively operated valves controlling communication between the cylinders and the atmosphere, spring valves also controlling communication between the cylinders and the atmosphere and closing permissively by the opening movement of the positively operated valves and opened by the closing movement of the positively operated valves, a plate angularly adjustable about the crank shaft, a series of tappets pivoted on said plate, cam faces on the tappets, a cam fixed on the crank shaft adapted to actuate the tappets, and means for adjusting the angular position of the tappet plate to vary the effective action of the cam.

In testimony whereof I affix my signature in presence of two witnesses.

HARRY GIBBS.

Witnesses:
A. J. DAVIES,
R. S. JONES.

Copies of this patent may be obtained for five cents each, by addressing the "Commissioner of Patents, Washington, D. C."